United States Patent [19]
Kallet

[11] 3,740,147
[45] June 19, 1973

[54] MICROSPECTROPHOTOMETER WITH TWO FIELDS OF VIEW

[75] Inventor: Eli A. Kallet, Teaneck, N.J.

[73] Assignee: Farrand Optical Co., Inc., Valhalla, N.Y.

[22] Filed: Jan. 10, 1972

[21] Appl. No.: 216,533

[52] U.S. Cl.................. 356/96, 350/81, 356/100
[51] Int. Cl........................ G01j 3/42, G02b 7/00
[58] Field of Search.............. 356/74, 79, 83, 89, 356/96, 97, 99; 331/94.5 A; 350/19, 244, 243

[56] References Cited
UNITED STATES PATENTS

| 3,527,536 | 9/1970 | Alpen | 356/96 |
| 3,437,411 | 4/1969 | Rudomanski et al. | 356/89 |
| 3,096,767 | 7/1963 | Gresser et al. | 331/94.5 A |
| 3,205,767 | 9/1965 | Weber et al. | 350/19 |

Primary Examiner—Ronald L. Wibert
Assistant Examiner—V. P. McGraw
Attorney—William E. Beatty

[57] ABSTRACT

The present invention is the combination of an instrument for viewing a specimen in combination with an analyzer for analyzing a targeted area of the specimen wherein the spectral bandwidth, the size, and the location of the targeted area are controlled by a common element.

4 Claims, 4 Drawing Figures

Patented June 19, 1973 3,740,147

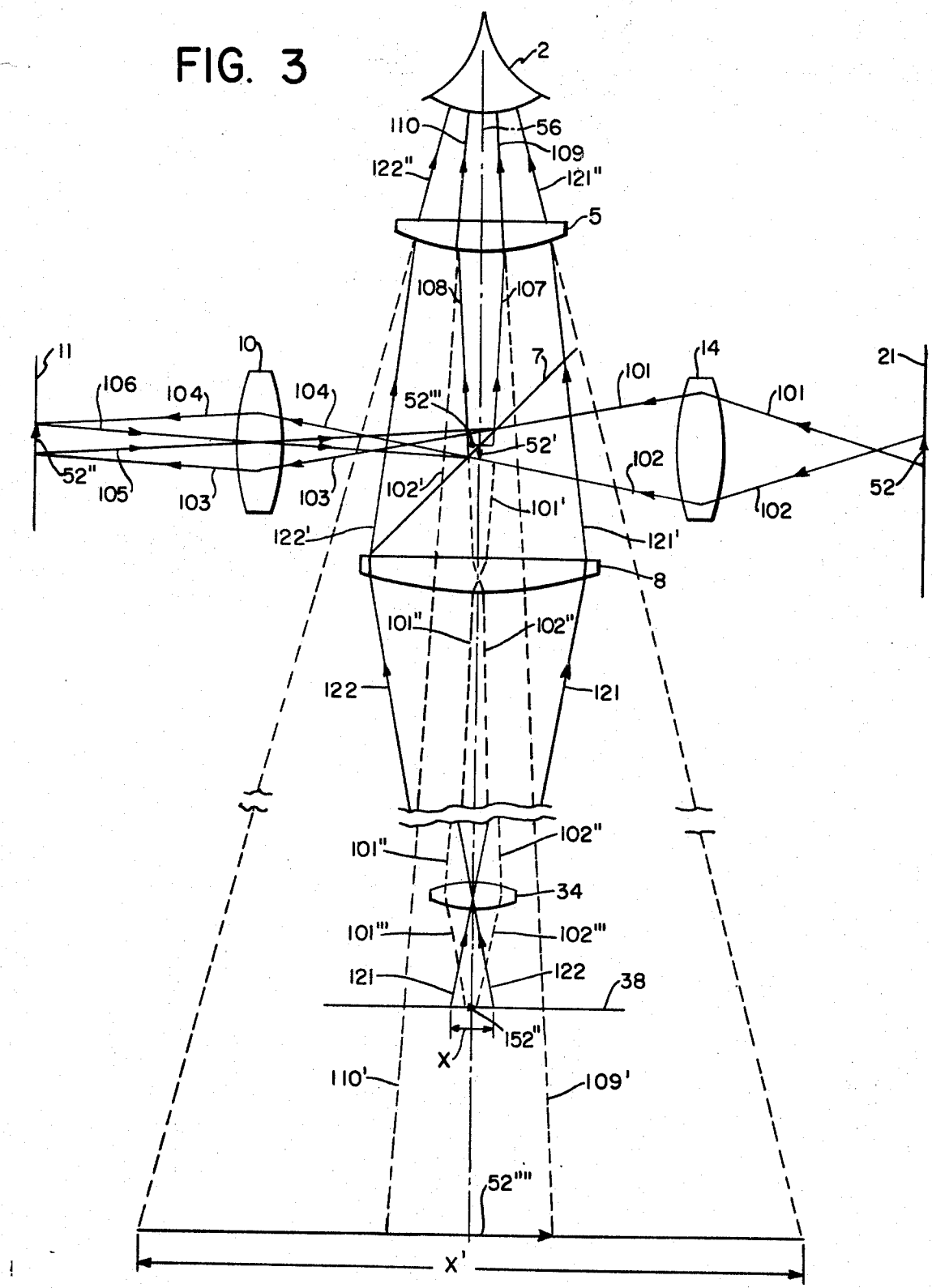

MICROSPECTROPHOTOMETER WITH TWO FIELDS OF VIEW

BACKGROUND OF THE INVENTION

The present invention relates to the field of instruments for analyzing radiant energy and is of particular interest in the field of the quantitative spectra analysis of microscope specimens.

In the analysis of specimens, the location of the target to be viewed, whether in a microscope, telescope, or other instrument, has long been of great interest. A typical prior art technique is the use of a reticle which is physically located on optical elements within the optical path. For systems with small fields of view within a comparatively large target, alignment of a reticle with the actual field view becomes a problem. The use of a reticle is either cumbersome or expensive for higher precision targeting.

Typical bio-medical applications where precise targeting is important include studies of antibodies and antigens as in rheumatic fever, parasitology, diagnostic virology, rickettsiology and mycology; studies of the antigenic relationships among micro-organisms, calls and tissues, and fluorescence tracing.

SUMMARY OF THE INVENTION

The present invention is the combination of an instrument for viewing a specimen in combination with an analyzer for analyzing a targeted area of the specimen wherein the spectral bandwidth, the size, and the location of the targeted area are controlled by a common element.

In one embodiment of the present invention, a microscope and a spectrum analyzer are combined wherein the entrance opening (e.g. slit or pin hole) which controls the spectral bandwidth of the light to the spectrum analyzer also controls the target area and location that the analyzer "sees." Means are provided for observing the location of the target area on the specimen so as to be within the field of view controlled by the entrance opening of the spectrum analyzer.

In another embodiment of the present invention, the entrance opening of the spectrum analyzer is scanned relative to the exit opening of the analyzer thereby scanning the target area across the specimen field of view of the microscope.

BRIEF DESCRIPTION OF THE DRAWINGS

FIG. 3 depicts a schematic optical ray trace for explaining the principles of the FIGS. 1 and 2 apparatus.

DETAILED DESCRIPTION

Figure 1:
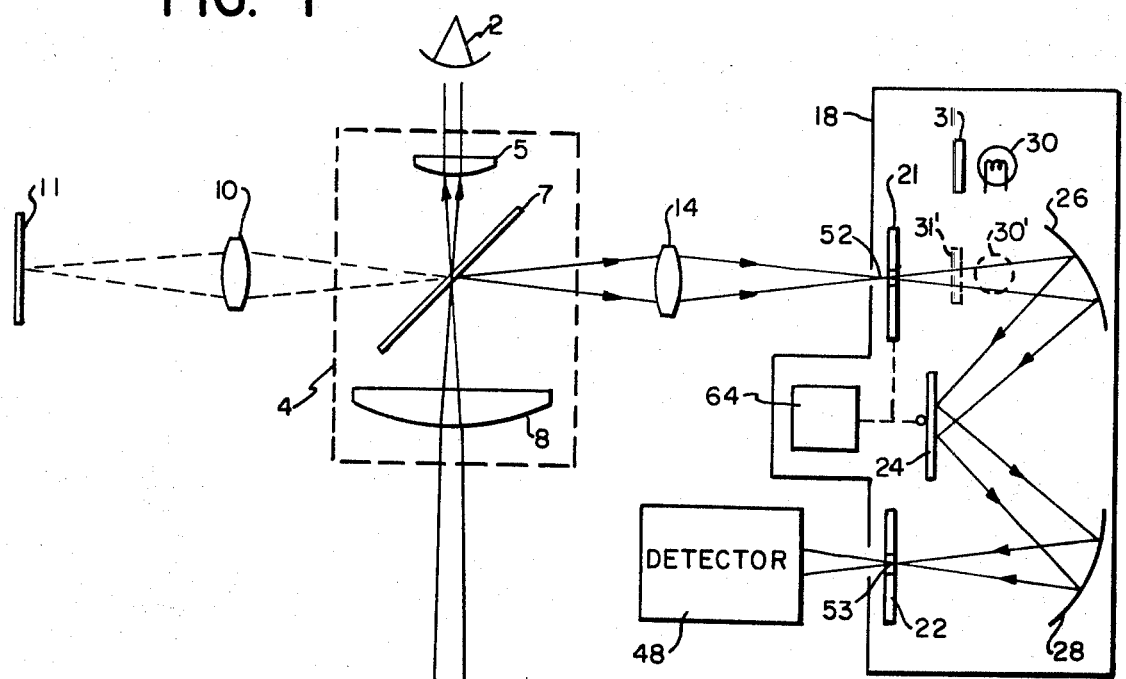
FIG. 1 depicts a schematic representation of a microscope spectrum analyzer including target spotting and target scanning features.

Referring to FIG. 1, the specimen 38 to be analyzed is placed upon the specimen holder 36 beneath the objective lens 34 of a microscope which has a microscope eyepiece 4. Radiation from source 45 via a mirror 43 and focusing lens 40 illuminates the specimen 38 so that the microscope, including objective lens 34 and eyepiece 4, provides a magnified view of the specimen at the observer's eye 2. The illumination from source 45 and mirror 43 is partially blocked by a disc 41 which causes the light in the area of the specimen 38 being viewed to be scattered and/or emission light rather than the direct illumination from source 45.

Eyepiece 4 includes a field lens 8 and an eye lens 5 which are both of standard design well known in the microscope art. Additionally, the eye piece 4 includes a beam splitter 7 at or near the focal plane of the eyepiece 4. Beam splitter 7 functions to receive and transmit light from and to a relay lens 14 into spectrum analyzer 18. Similarly, beam splitter 7 also functions to receive and transmit light to and from relay 10 and mirror 11.

Spectrum analzer 18 includes a member 21 having an entrance opening 52 for receiving light from and transmitting light to relay lens 14. Light from relay 14 is reflected from curved mirror 26 to the ruled grating 24. Ruled grating 24 diffracts light to curved mirror 28 which transmits it through the exit opening 53 in member 22 to a detector 48.

The spectrum analyzer 18 is typically a conventional monochromator of the Czerny-Turner type. Instead of the usual entrance slit in member 21, one of a plurality of different size pin holes like pin hole 52 provides a choice of fields of view of the specimen 38. For example, pin holes of diameters 0.09 to 0.22 millimeters provide fields of view at the specimen from 1 to 25 microns, respectively. To achieve this range it is necessary to shift objectives for standard microscopes.

While the entrance opening 52 controls the field of view, opening 52 additionally controls the spectral bandwidth of the incident light to the spectrum analyzer 18.

Spectrum analyzer 18 additionally includes a source of illumination 30 behind a diffuser 31, both shown in their retracted position so as not to interfer with the light from relay lens 14 incident upon the mirror 26. Light source 30 and diffuser 31 are movable to a phantom position 30' and 31' where they radiate through the opening 52 to relay 14 and beam splitter 7 for defining an exact target position on specimen 38. Light source 30' can be used to transmit light from beam splitter 7 through lens 8 and objective lens 34 to specimen 38 and reflected thereafter back through those lenses to the beam splitter 7, eye lens 5 and ultimately to the observer's eye 2. Because of the low level of light reflected back, however, relay lens 10 and mirror 11 are employed to intensify the image at the observer's eye. Light source 30 should preferably be at a low output level to prevent objectionable backscatter glare to the eye, principally caused by reflections from field lens 8. A tungsten filament bulb with approximately a one watt output has been found satisfactory. The effect of placing the light source and diffuser 30' and 31' so as to radiate through the opening 52 insures that the field of view for the spectrum analyzer 18, corresponding to a target area on specimen 38, will be the same field of view seen by the observer's eye 2. With this apparatus, the observer is able to see exactly the same field of view which is transmitted to the spectrum analyzer 18. The observer may, for example, by laterally moving the specimen holder 36 relative to the objective lens 34, select any target area on specimen 38 which he desires to observe using the target spotting feature of light source and diffuser 30' and 31' in the phantom position. Thereafter, the target field of view selected by the observer is analyzed by the spectrum analyzer 18 by retracting the light source 30 and diffuser 31 to the real position shown.

Figure 2:
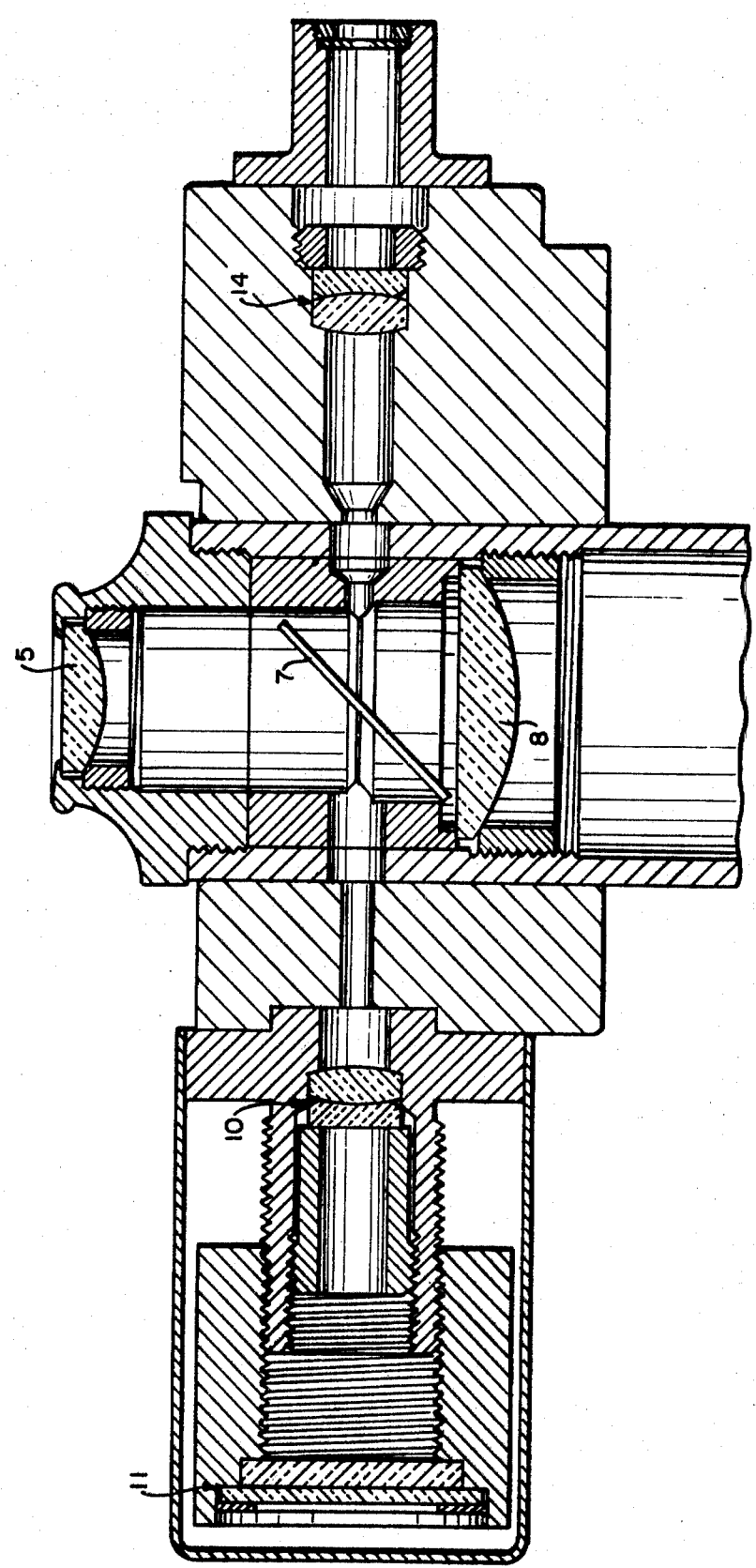
FIG. 2 depicts a detailed sectional view of the eyepiece portion of the FIG. 1 microscope apparatus.

Referring to FIG. 2, a front sectional view of the eyepiece assembly, the relay lenses, and the mirror of FIG. 1 are shown. The eye lens 5, beam splitter 7, relay lenses 10 and 14, and mirror 11 and field lens 8 all correspond to the like-numbered elements in FIG. 1. FIG. 2 is drawn approximately three times actual size. Relay lenses 10 and 14 are conventional and may be compound lenses as indicated in FIG. 2. The relay lenses 10 and 14 generally have a unity magnification with focal planes for lens 10 at mirror 11 and at the center of beam splitter 7. The optical principles of the FIG. 1 and FIG. 2 apparatus can be best understood with reference to FIG. 3.

Referring to FIG. 3, the observer's eye 2, the eye lens 5, the beam splitter 7, the field lens 8, the objective lens 34, the specimen 38, the relay lenses 10 and 14, the mirror 11, and the member 21 all correspond to the like-numbered elements previously identified in FIG. 1.

When, with reference to FIG. 1, light source 30' and diffuser 31' are in the phantom position, the entrance opening 52, shown by an upright arrow in FIG. 3, is imaged upside down along the optical axis 56 in the vicinity of the beam splitter 7 as shown by the inverted image 52'. The inverted image 52' is in turn imaged as indicated by rays 103 and 104 through relay lens 10 as an upright image 52'' on mirror 11. Image 52'' is in turn re-imaged by lens 10 in the vicinity of beam splitter 7 as indicated by rays 105 and 106. Rays 105 and 106 are reflected by beam splitter 7 forming rays 107 and 108. As indicated by the trace and projection back of rays 107 and 108, relays lens 10 and beam splitter 7 operates to form the image 52''' from the image 52''. The image 52'' as represented by rays 107 and 108 is transmitted by eye lens 5 to the observer's eye 2. Rays 107 and 108 are redivided as rays 109 and 110, respectively. The observer's eye 2 appears to see an image of the size 52'''' which is indicated by projecting back the rays 109 and 110 as shown by broken line rays 109' and 110', respectively.

The rays 109 and 110 are drawn assuming an origin light transmitted by opening 52, relay lens 14, beam splitter 7, relay lens 10, mirror 11, back through relay lens 10, beam splitter 7 and up to the eye lens 5. Additionally, rays 101 and 102 from relay lens 14 also produce rays 101', 102', 101'' and 102'', and 101''' and 102''' which forms an image 152'' at specimen 38. Image 152'' on the specimen 38 corresponds to the field of view transmitted to the opening 52 in member 21 by light source 45 of FIG. 1 or by light reflected back from rays 101''' and 102'''. The image 152'' reflected back through objective lens 34 and field lens 8 also produces the image 52''' in the exact same location as the image 52''' derived from the image 52'' at mirror 11.

In accordance with the present invention, the eye lens 5 has the beam splitter 7 located at its object plane which is located at the position of image 52'''. Eye lens 5 is an imaging lens which re-images image 52''' to an observer's eye 2, or alternatively, to a TV camera or other apparatus. The purpose is to have the image formed by the imaging lens 5 to exactly identify the same field of view as that transmitted to the spectrum analyzer 18 through the entrance opening 52. Because of the placement of the beam splitter 7 at the object plane of imaging lens 5, and the flat reflector 11 at a focal plane, the alignment of the relay lens 10 and the mirror 11 is not critical to make the identity of the fields of view exact. Relay lens 10 and mirror 11 are means for re-imaging image 52' upon itself as indicated generally by image 52'''.

As previously indicated in connection with FIG. 2, relay lens 10 and 14 are substantially identical and equally spaced from the optical axis 56 upon which the image 52' is formed. Similarly, the mirror 11 and the member 21 are also symmetrically and equally spaced from the optical axis 56 and the relay lenses 10 and 14, respectively. Although these conditions have been selected for design convenience, they are, of course, not requirements of the inventions. Assymetrical arrangements can be employed.

OPERATION

Figure 4:
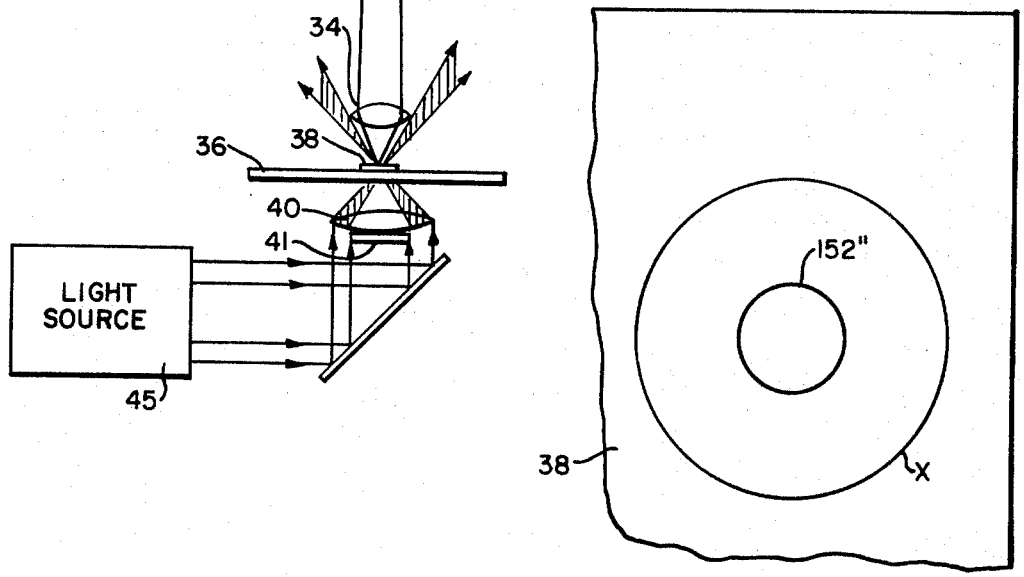
FIG. 4 depicts a schematic representation of the superposed fields of view of the microscope spectrum analyzer.

The operation of the apparatus of the present invention as a microscope spectrum analyzer contemplates the observer locating a specimen 38 on a specimen holder 36. Specimen 38 is illuminated by light source 45 and radiates through objective lens 34 of the microscope as generally depicted in FIG. 1. The observer's eye 2 sees a particular field of view which is generally the size of the dimension $x$ as indicated in FIGS. 3 and 4. The dimension $x$ is larger than the field of view transmitted to the spectrum analyzer 18 as generally identified by the image 152''. In FIG. 3, the relative size of the total field of view transmitted through imaging lens 5 compared to the smaller field of view transmitted to the spectrum analyzer can be appreciated by comparing the size of the image 52''''' to the dimension $x'$ projected as it appears in FIG. 3 to observer's eye 2. By laterally sliding the specimen holder 36, the total field of view of dimension $x$, as well as the smaller field of view 152'' of the spectrum analyzer, is shifted to any area of the specimen 38 which is desired.

When it is desired to illuminate that portion of the total field of view $x$ encompassed by the spectrum analyzer field of view which appears in the output from the imaging lens 5, the light source 30 and diffuser 31 are moved to the phantom positions 30' and 31'. With the light source in the phantom position, the radiated light through opening 52 is transmitted via relay lens 10 and mirror 11 to beam splitter 7 forming the image 52''' as previously described. The image 52''' is re-imaged by eye lens 5 to the observer's eye 2. Eye lens 5, of course, can be an alternative form of imaging lens if the output from lens 5 is directed to a TV camera or other apparatus.

When the observer has selected an area of the specimen 38 which he desires to be analyzed by spectrum analyzer 18, the lamp 30' and diffuser 31' are moved to the real positions 30 and 31 allowing the radiation from the image 152'' area of the specimen 38 to be transmitted through the opening 52 for spectrum analysis. Appropriate output readings generated by signals from detector 48 produce the desired quantitative analysis of the targeted area 152'' of specimen 38.

FURTHER AND OTHER EMBODIMENTS

While it has been generally indicated that lamp 30 and diffuser 31 are movable in and out of the optical path between opening 52 and curved mirror 26, alternative multiplexing techniques may be employed. For example, a beam splitter may be inserted in the optical path between opening 52 and mirror 26 so that lamp 30 continuously radiates through opening 52 to display continuously the field of view location as an output from imaging lens 5. The scatter illumination in such an inserted beam splitter due to the light from lamp 30 might deleteriously effect the reading of detector 48. Lamp 30 and detector 48, therefore, are preferably multiplexed in operation such that whenever lamp 30 is energized, detector 48 is inhibited and whenever lamp 30 is shut off, detector 48 makes its reading. Alternatively, a mechanical multiplexer, such as a rotating disc, at an angle of 45 degrees to the optical path between opening 52 directly and mirror 26, may be employed. Part of the rotating disc is comprised of open areas which allow the radiation from relay lens 14 to pass through opening 52 directly to mirror 26. The remainder of the rotating disc is a mirror surface for transmitting the light from lamp 30 through the opening 52 to relay lens 14 to produce the field of view identification output from lens 5.

While the beam splitter 7 is one convenient method of diverting and introducing the light at the object plane of imaging lens 5, other apparatus for making the insertion can be employed. For example, a rotating multiplexing wheel like that previously described in connection with light source 30 may also be employed in place of beam splitter 7.

While relay lens 10 and mirror 11 are one preferred embodiment for re-imaging the light from opening 52 at the object plane of imaging lens 5, a spherical reflector could also be employed. The image 52' is again re-imaged and appears as image 52'''. Alternatively, a retroreflector, such as a triple mirror prism, may also be employed in place of the mirror 11 if relay lens 10 is set for infinity focus on the prism side.

While the member 21 and the grating 24 have previously been described as stationary members, in accordance with an alternate embodiment of the present invention, drive means 64 is employed to cyclically oscillate grating 24 while simultaneously reciprocating member 21 to translate the opening 52 in the plane of the paper. In this manner, the field of view relative to the specimen 38 is caused to translate back and forth so that specimen 38 is scanned without changing the spectral center frequency being analyzed.

While the invention has been particularly shown and described with reference to preferred embodiments thereof, it will be understood by those skilled in the art that various changes in form and details may be made therein without departing from the spirit and the scope of the invention.

What is claimed is:

1. An apparatus for analyzing a specimen including,
   first means for imaging a first field of view representing a portion of the specimen to be analyzed, said first means including an imaging lens having an object plane,
   said apparatus further including second means for receiving a second field of view representing a portion of said specimen to be analyzed, the improvement comprising,
   transmitting means located at the object plane of said imaging lens for transmitting said first and second fields of view simultaneously along first and second optical paths and wherein said second field of view is simultaneously included within said first field of view,
   said second imaging means including a spectrum analyzer having an entrance opening for defining said second field of view along said second optical path and controlling the spectral bandwidth, the size, and location of said second field of view,
   a light source included in said second imaging means for radiating through said entrance opening along said second optical path to said transmitting means whereby a representation of the size and location of said second field of view forms an entrance opening image at said transmitting means.

2. The apparatus of claim 1 wherein said first means comprises a microscope, wherein said imaging lens is the eye lens of said microscope, and wherein said transmitting means is a beam splitter.

3. The apparatus of claim 1 further including,
   a relay lens and a mirror coaxial with said second optical path for re-imaging said entrance image at said transmitting means whereby said imaging lens forms an image representing the size and location of said second field of view superposed with said field of view.

4. The apparatus of claim 1 wherein said spectrum analyzer includes a ruled grating for receiving the radiation through said entrance opening and further including means for translating said entrance opening while simultaneously rotating said grating to thereby scan said second field of view across said specimen.

* * * * *